Feb. 11, 1964   P. J. LONG, JR   3,120,962
CLEARANCE HEIGHT CONTROL SYSTEM
Filed Oct. 31, 1960   4 Sheets-Sheet 1

INVENTOR.
Paul J. Long, Jr.
BY
HIS ATTORNEY

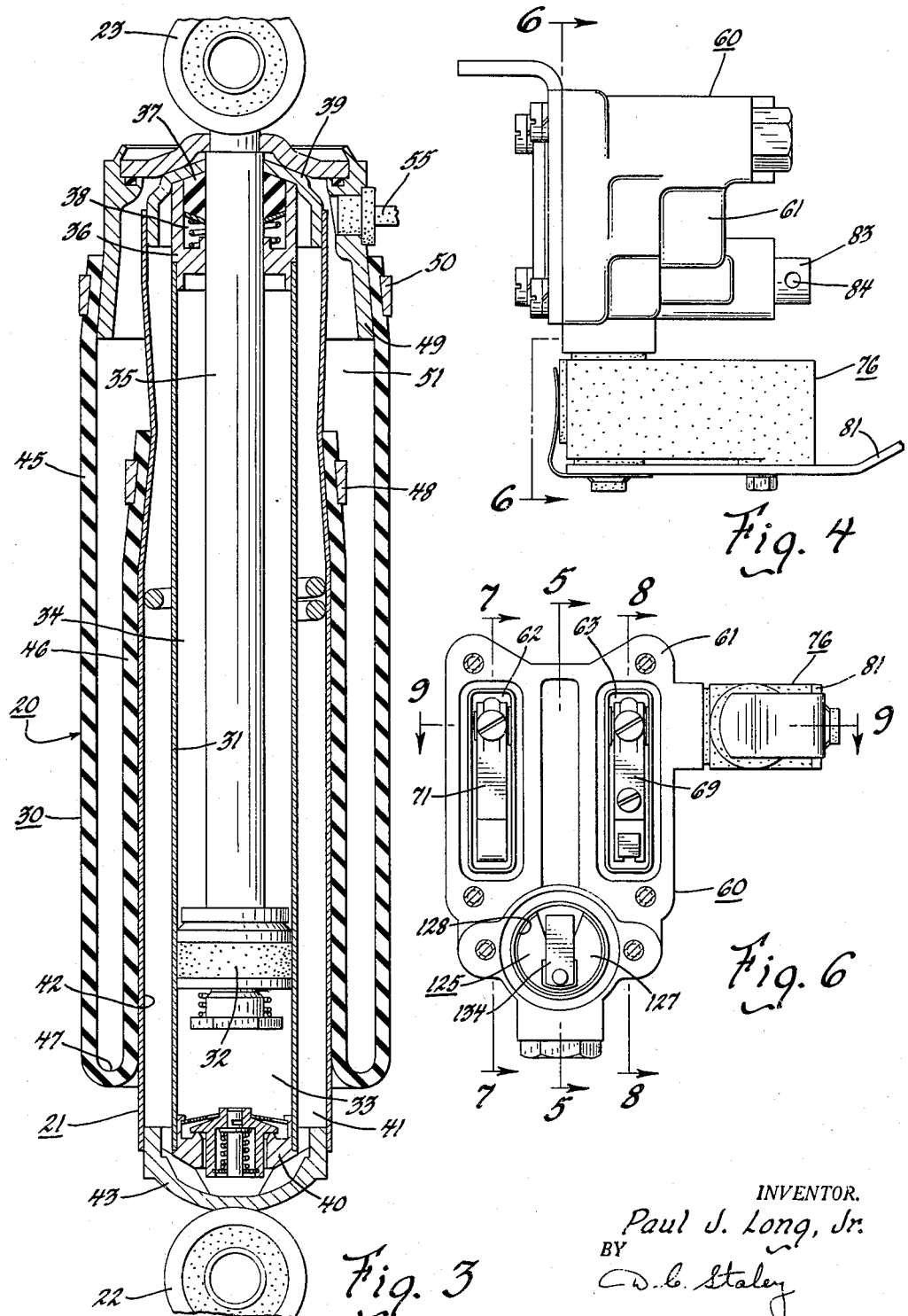

INVENTOR.
Paul J. Long, Jr.
BY
D. C. Staley
HIS ATTORNEY

Feb. 11, 1964 P. J. LONG, JR 3,120,962
CLEARANCE HEIGHT CONTROL SYSTEM
Filed Oct. 31, 1960 4 Sheets-Sheet 4

INVENTOR.
Paul J. Long, Jr.
BY
HIS ATTORNEY

United States Patent Office 3,120,962
Patented Feb. 11, 1964

3,120,962
CLEARANCE HEIGHT CONTROL SYSTEM
Paul J. Long, Jr., Dayton, Ohio, assignor to General Motors Corporation, Detroit, Mich., a corporation of Delaware
Filed Oct. 31, 1960, Ser. No. 66,269
6 Claims. (Cl. 280—6)

This invention relates to a clearance height control system adapted for use on an automotive vehicle to maintain an established clearance height between the sprung mass and the unsprung mass of the vehicle. Particularly, the invention relates to such a system wherein the main suspension spring or springs for the vehicle are supplemented in their resilient support of the sprung mass by an air spring disposed adjacent each of the main suspension springs, particularly at the rear of the vehicle. Normally the air springs are operated in a deflated condition so that the main suspension springs provide the normal support of the sprung assembly on the unsprung assembly, the main suspension springs providing for a normal established clearance height between the sprung assembly and the unsprung assembly.

However, when the load in the vehicle is increased so as to cause the rear end of the vehicle to ride at a clearance height that is lower than that normally desirable, the air springs can be pressurized with a suitable fluid, such as air, to offset the increased load carried in the vehicle and return the sprung assembly to the normal established clearance height between the sprung mass and the unsprung mass of the vehicle.

An object of the invention is to provide an automatic control system which functions to pressurize the supplementary air springs when the sprung assembly of the vehicle moves downwardly below the normally established clearance height with the sprung mass and the unsprung mass in a static condition, the automatic control system being constructed and arranged in a manner that fluid, such as air under pressure, will be supplied to the auxiliary air springs until the established clearance height has been re-established. Also, when the sprung assembly rises above the normally established clearance height, the automatic control system will cause exhaust of fluid from the auxiliary air springs so that the sprung mass can return to the normally established clearance height.

The foregoing object of the invention is accomplished by providing a clearance height control mechanism that is responsive to the clearance height relation between the sprung assembly and the unsprung assembly of the vehicle, the clearance height control mechanism being provided with electric control means, such as an electric switch, which is adapted to energize an electric circuit which in turn energizes an electrically operated control that controls supply of fluid or air pressure to the air spring, the electrically operated device being preferably in the form of an electrically operated air compressor connected in circuit with the battery of the vehicle. When the clearance height relation between the sprung assembly and the unsprung assembly is lower than that normally maintained by the main suspension springs of the vehicle, when the vehicle is in static condition, the clearance height control mechanism will cause the electrically operated compressor to function so as to supply air under pressure to the air springs until such time as the static clearance height is re-established to that normally maintained by the main springs of the vehicle, at which time the clearance height control mechanism will cause the electric switch to open and thereby stop the compressor from further supply of air pressure to the auxiliary air springs.

Also, the clearance height control mechanism is provided with a fluid flow control valve which is responsive to the static clearance height relation between the sprung assembly and the unsprung assembly of the vehicle so that when the sprung assembly rises above the normal static clearance height maintained by the main suspension springs of the vehicle, the valve will be opened to exhaust air under pressure from the auxiliary air springs and allow the sprung assembly to return to the normally maintained clearance height established by the main suspension springs of the vehicle.

It is a further object of the invention to provide a clearance height control system for accomplishing the results of the foregoing objects wherein the electric control switch and the exhaust control valve are both incorporated in a single clearance height control mechanism so that they can be operated alternately on a decrease or an increase respectively of the clearance height relation between the sprung assembly and the unsprung assembly of the vehicle.

It is also an object of the invention to place the control system under control of the operator of the vehicle by providing a control switch which can be actuated by the operator to render the automatic clearance height control system effective to perform the functions hereinbefore set forth.

It will be understood that while the height control system hereinbefore mentioned with reference to the foregoing objects as being useful for control of auxiliary air springs is concerned, the control system can also be used to control the main air spring between a sprung assembly and an unsprung assembly without departing from the scope of the invention.

Further objects and advantages of the present invention will be apparent from the following description, reference being had to the accompanying drawings wherein a preferred embodiment of the present invention is clearly shown.

In the drawings:

FIGURE 3 is a cross-sectional view of an auxiliary air spring adapted to be used in cooperation with the main suspension springs of the motor vehicle.

FIGURE 4 is an elevational view of a clearance height control mechanism adapted for use in the system of this invention.

FIGURE 6 is a cross-sectional view taken substantially along lines 6—6 of FIGURE 4.

Figure 1:
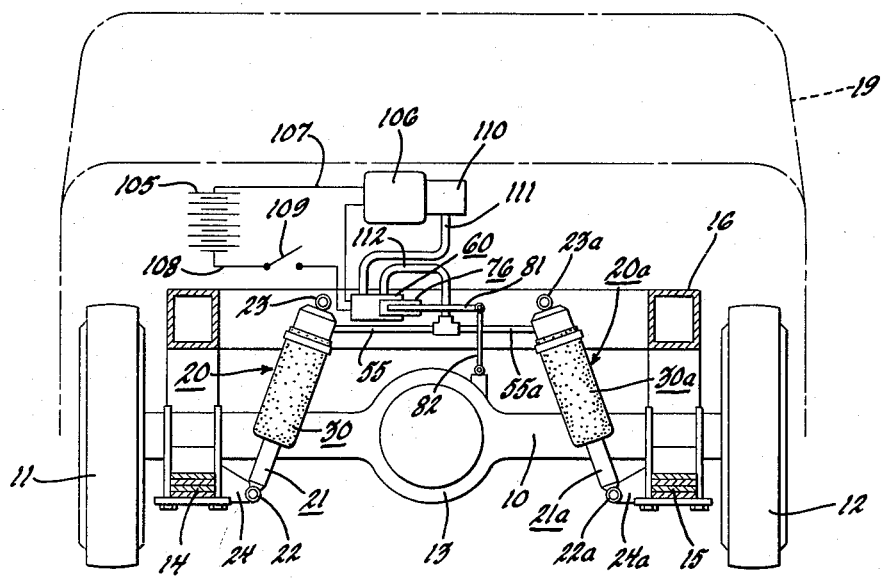
FIGURE 1 is a schematic view of a motor vehicle illustrating the use of the clearance height control system of this invention.
Figure 2:
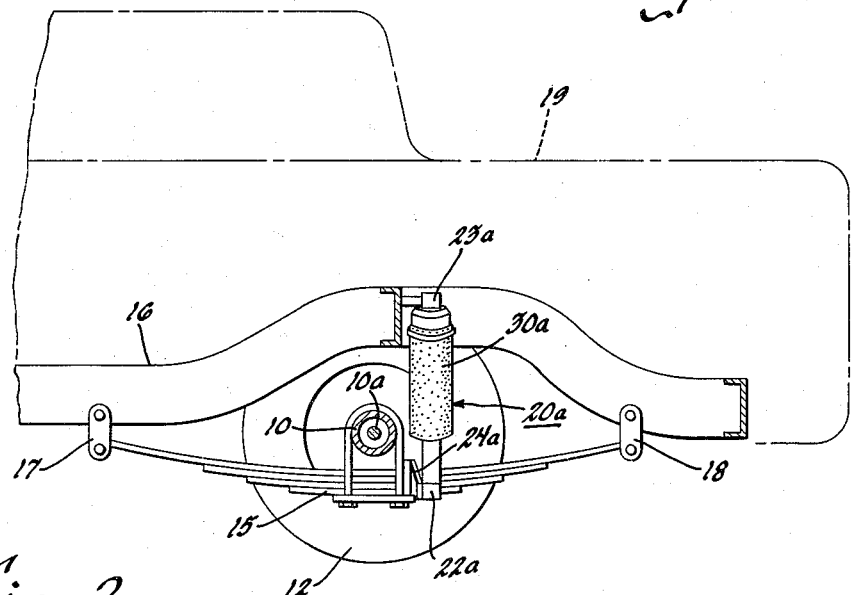
FIGURE 2 is a schematic view of the motor vehicle taken longitudinally of the vehicle.

Referring to the drawings, in FIGURES 1 and 2, there is illustrated schematically an automotive vehicle incorporating a clearance height control system including features of this invention. The motor vehicle may consist of an axle housing 10 having axially spaced wheels 11 and 12 that are suitably carried on the axle within the axle housing in any conventional manner. The axle housing 10 includes a differential 13 so that the wheel and axle assembly illustrated in the drawing represents the rear axle assembly of a motor vehicle. The axle housing 10 includes the axle 10a for driving the wheels.

The axle housing 10 supports the main suspension springs 14 and 15 adjacent the respective wheels 11 and 12 having opposite ends connected with the chassis or frame 16 by means of suitable shackles, such as those illustrated by the numerals 17 and 18 for the spring 15 shown in FIGURE 2. The chassis 16 supports any conventional body 19. Thus the unsprung assembly consisting of the axle housing 10 and the wheels 11 and 12 and the associated springs support the sprung assembly comprising the chassis 16 on the body 19.

Conventionally, the main suspension springs 14 and 15 are engineered to provide for a normal established clearance height relationship between the unsprung assembly and the sprung assembly when the vehicle is in a static unloaded condition. Also, the main suspension springs 14 and 15 are engineered to support the normal loads carried by the vehicle without too great a decrease in the static clearance height between the sprung assembly and the unsprung assembly.

A combination shock absorber and air spring assembly, such as that illustrated in FIGURE 3 is placed adjacent the main suspension spring 14, the assembly being represented by the numeral 20. A similar combination shock absorber and air spring assembly 20a is positioned adjacent the main suspension spring 15.

The shock absorber assemblies 20 and 20a are identical in construction, as illustrated in FIGURE 3, with the shock absorber 21 thereof being provided with ring connectors 22 and 23 at opposite ends thereof by which the shock absorber is connected to the main spring 14 by the ring connector 22 through the bracket 24 and with the chassis 16 by the ring connector 23. The connections 22 and 23 may be of conventional type.

Similarly, the combination shock absorber and air spring unit 20a has the ring connections 22a and 23a that connect with the spring 15 through the bracket 24a and with the chassis 16. Thus, the shock absorbers 21 and 21a serve their normal purpose of damping relative movement between the sprung assembly and the unsprung assembly of the vehicle.

An auxiliary air spring 30 surrounds the shock absorber 21 as does an auxiliary air spring unit 30a around the shock absorber 21a. The auxiliary air spring 30 is normally depressurized so that the main springs 14 and 15 resiliently support the sprung assembly on the unsprung assembly. However, when the load in the vehicle is such as to cause a decrease in the clearance height relation between the sprung assembly and the unsprung assembly of the vehicle, the air spring units 30 and 30a can be pressurized with a suitable fluid, such as air, to aid the main springs 14 and 15 in resilient support of the sprung assembly on the unsprung assembly, sufficient air under pressure being delivered into the respective air springs 30 and 30a to offset the increase in load in the vehicle and re-establish the normally maintained clearance height relation between the sprung mass and the unsprung mass of the vehicle.

As shown in FIGURE 3, the combination shock absorber and air spring unit 20 consists of a direct acting tubular type shock absorber 21 having relatively telescoping parts that are respectively connected with the main spring 14 and the chassis 16 of the vehicle.

The shock absorber 21 consists of a pressure cylinder 31 in which a piston 32 reciprocates. The piston 32 is provided with conventional valving that provides for control flow of hydraulic fluid between the compression chamber 33 and the rebound chamber 34 at opposite sides of the piston 32 within the pressure cylinde 31. The piston 32 is carried on a rod 35 that extends through a rod guide 36 at one end of the pressure cylinder 31 which closes the same and through a rod seal member 37 carried in a seal chamber 38 that is closed by an end cap 39. The rod 35 carries the mounting ring 23 that is adapted for attachment to the chassis 16 of the vehicle.

The opposite end of the pressure cylinder 31 is closed by a base valve structure 40 of any conventional type that is adapted to restrictively control flow of hydraulic fluid from the compression chamber 33 into the reservoir chamber 41 provided between the pressure cylinder 31 and the reservoir tube 42 that is closed at the bottom end by a closure cap 43 that carries the mounting ring 22 by which the shock absorber is attached to the unsprung assembly of the vehicle. The base valve 40 is also adapted to provide for relatively free flow of hydraulic fluid from the reservoir chamber 41 back into the compression chamber 33 when the piston 32 moves away from the base valve 40. The upper end of the reservoir tube 42 is secured to the closure cap 39 to close this end of the reservoir space 41.

Thus the shock absorber 21 consists of the relatively telescoping parts consisting of the rod 35 and the pressure cylinder 31 by which the shock absorber can extend and collapse for damping relative movement between the sprung assembly and the unsprung assembly of the vehicle.

The air spring 30 consists of a flexible walled structure comprising an outer wall 45 and an inner wall 46 that are interconnected by a return bend portion 47 formed of the inner and outer walls respectively as the walls reciprocate with the reciprocable members of the shock absorber. The inner wall 46 is secured to the reservoir tube 42 by means of a friction clamping device 48 and the outer wall 45 is secured to a cup shaped member 49 by a friction clamping device 50 thereby forming a closed chamber space 51 that is adapted to be pressurized through an inlet connection 55.

Fluid under pressure is supplied to the pressure chamber 51 of the air spring 30 and fluid under pressure is exhausted from the chamber 51 by means of a clearance height control mechanism 60 carried on the chassis 16 of the vehicle. The clearance height control mechanism is more particularly illustrated in FIGURES 4 to 9 inclusive.

The clearance height control mechanism consists of a body 61 having the chambers 62 and 63. The chamber 62 has a port opening 64 that connects with a suitable source of air under pressure hereinafter described. The chamber 63 has a port opening 65 that connects with the inlet conduit 55 of the air springs in a manner hereinafter described. The two chambers 62 and 63 are interconnected through a cross connecting port 66.

Chamber 63 has an exhaust passage 67 that contains an exhaust control valve 68 that may be a standard tire type valve adapted to control exhaust of fluid under pressure from chamber 63 to the atmosphere through port 67, valve 68 normally being closed to prevent escape of air from chamber 63 and thereby from chamber 62 and thereby from the pressure chamber 51 of the air spring.

Figure 9:
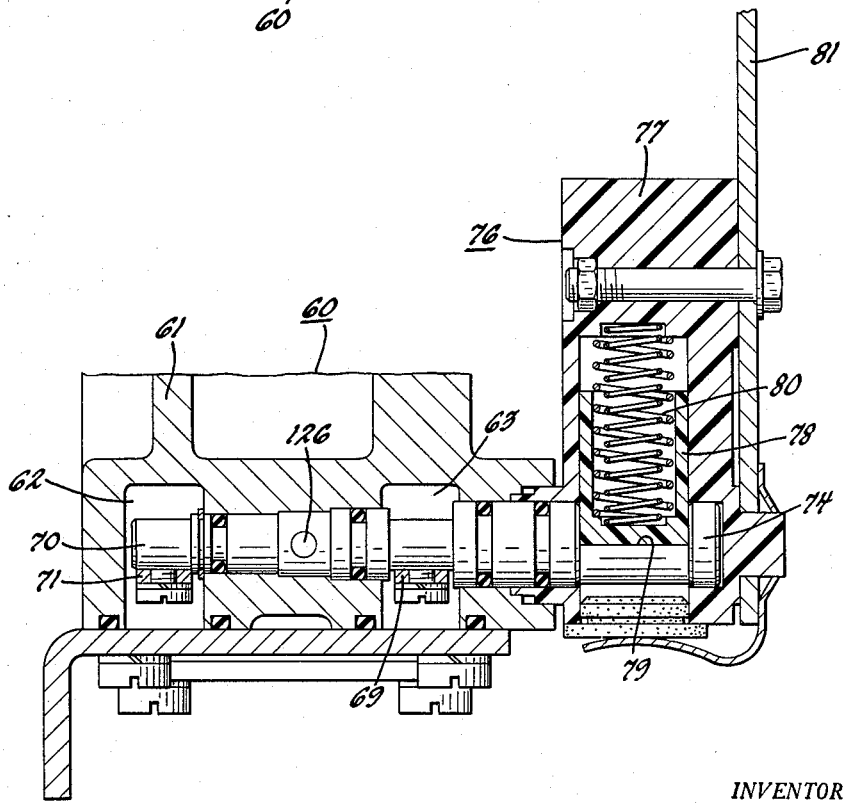
FIGURE 9 is a cross-sectional view taken along line 9—9 of FIGURE 6 illustrating an overtravel mechanism for the clearance height control mechanism.

The exhaust control valve 68 is actuated by an operating arm 69 carried on an oscillatable shaft 70 suitably journalled in the housing 61, as shown in FIGURE 9. One end of the oscillatable shaft 70 extends into the chamber 62 and has an operating arm 71 that controls actution of an electric switch 75 that in turn controls an electrically operated air compressor unit in a manner hereinafter described. The oscillatable shaft 70 has an end 74 extending from the housing 61 that supports an overtravel mechanism 76 by which relative movement between the sprung assembly and the unsprung assembly can be greater than the movement of the operating arms 69 and 71 which control operation of the exhaust valve 68 and the electric switch 75, respectively. The overtravel mechanism 76 consists of a housing 77 that carries a piston 78 the head of which engages a flat surface 79 on the oscillating shaft 70 normally to oscillate the shaft in unison with the relative movement between the sprung assembly and the unsprung assembly of the vehicle. However, when the relative movement between the assemblies is greater than that allowed for operation of the exhaust valve 68 and the electric switch 75, the springs 80 will allow the piston to move relative to the shaft 70 to provide for overtravel of the operating arm 81 that is connected with the unsprung assembly by means of a suitable connecting link 82, shown in FIGURE 1. The exhaust port 67 contains a filter element 82' contained in a fitting 83 that has port openings 84 to allow for exhaust of air from the chamber 63 and thereby from the air spring 20.

Figure 7:
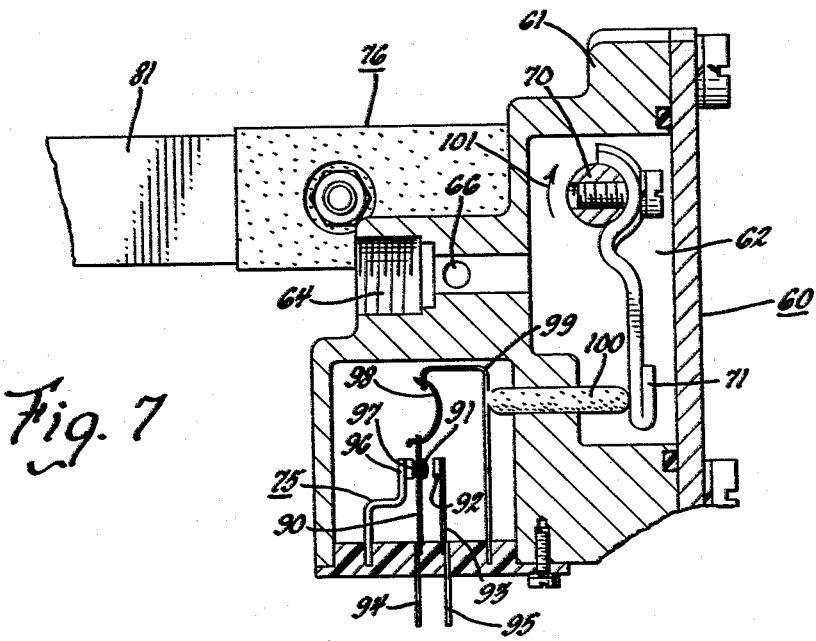
FIGURE 7 is a cross-sectional view taken along line 7—7 of FIGURE 6 illustrating the control switch for operating the electric compressor of the control system.

The electric switch 75, shown particularly in FIGURE 7, consists of a flat leaf 90 carrying the contact 91 adapted to engage the contact 92 carried on the stationary arm 93 so that when contacts 91 and 92 are closed electric circuit can be made through the conductor elements 94 and 95. A stop member 96 is engaged by a back contact 97 when the switch 75 is in the normal position shown in FIGURE 7. A C spring 98 extends between the leaf member 90 and the leaf type actuating arm 99 and provides an over-center snap operating mechanism to move the contacts from the open position shown in FIGURE 7 to the closed position against contact 92, a plunger member 100 being engaged by the operating arm 71 to actuate the switch 75 when the shaft 70 oscillates in the direction of the arrow 101. Similarly, when the shaft 70 rotates in the direction of the arrow 102 shown in FIGURE 8, the exhaust valve 68 will be opened.

The electric conductors 94 and 95 of the clearance height control mechanism are connected with a battery 105 and an electric motor 106 by means of the electric wires 107 and 108 in circuit with a manually operated switch 109, which starts the motor 106 when the switch 75 is closed and which stops the motor when the switch 109 is opened.

The electric motor 106 drives the air compressor 110 that supplies are under pressure into the conduit 111 that supplies fluid under pressure into the port opening 64 of the clearance height control mechanism 60. The port opening 65 of the control mechanism 60 connects with a conduit 112 that in turn connects with the inlet conduits 55 and 55a for the respective air springs 20 and 20a, as more particularly shown in FIGURE 1.

From the foregoing description, it will be apparent that when the sprung mass or sprung assembly 16 moves downwardly toward the unsprung assembly 10—11, the control mechanism 60 will be operated through the operating arms 81 and 82 to rotate the shaft 70 in the direction of the arrow 101 shown in FIGURE 7 to operate the control switch 75 to move it from its open position to its closed position and thereby energize the electric motor 106, assuming switch 109 is closed, to start the compressor and supply air under pressure to the air springs 30 and 30a respectively until the clearance height relation between the sprung assembly and the unsprung assembly has been re-established to that normally maintained by the main springs 14 and 15 when the vehicle is in static condition. Obviously, this can occur only when the switch 109 is closed which is under the manual control of the operator of the vehicle. Thus, normally, the clearance height control system is rendered ineffective when the switch 109 is open but is automatically effective to re-establish a normally maintained clearance height relation when the switch 109 is closed.

Figure 8:
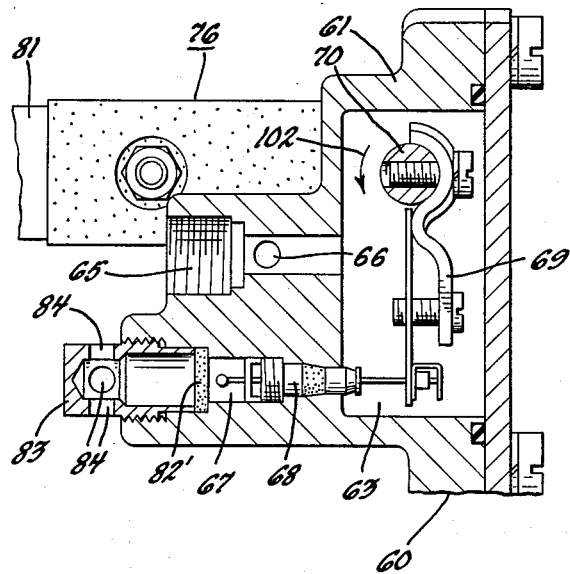
FIGURE 8 is a cross-sectional view taken along line 8—8 of FIGURE 6 illustrating the exhaust control valve for the control system.

So long as switch 109 is closed and the load is thereafter removed from the vehicle, the air pressure within the air springs 30 and 30a, being additive to the effect of the main springs 14 and 15, will cause the sprung assembly 16 to rise above the normally maintained clearance height relation so that under this circumstance the control mechanism 60 will rotate the shaft 70 in the direction 102 on FIGURE 8 and thereby open the exhaust valve 68 to depressurize the air springs 30 and 30a and allow the sprung assembly 16 to return to the clearance height relation normally maintained by the main springs 14 and 15.

From the foregoing description, it will be apparent that so long as switch 109 is open the clearance height control system will be rendered ineffective. Thus under normal loading conditions of the vehicle for which the main springs 14 and 15 are engineered, the clearance height control system need not be rendered effective so that the air springs 30 and 30a will normally operate in a deflated or depressurized condition and have substantially no effect in the normal operation of the main springs 14 and 15 in their support of the sprung mass or in the "ride" of the vehicle. However, when the clearance height control system is rendered effective by the operator of the vehicle closing switch 109, it is also obvious that it is not desirable for the switch 75 and the exhaust valve 68 to be continously operated alternately to start the compressor 10 to supply fluid under pressure to the air springs and to exhaust fluid from the air springs. Therefore, the clearance height control mechanism is provided with a movement damping device 125 that is constructed and arranged in a manner that the damping device resists movement of the control arms 69 and 71 and oscillation of the shaft 70 from a neutral position at which exhaust valve 68 is closed and electric switch 75 is opened for a predetermined time period, after which the shaft 70 is permitted to move to operate either the valve 68 or the switch 75, depending on the direction of movement of the operating arm 81. The damping device 125 is also constructed and arranged in a manner that while it resists movement of the arms 69 and 71 from the neutral position at which valve 68 is closed and switch 75 is open, it will also allow for a rapid return of the arms 69 and 71 to their neutral position after they have moved away from neutral position so that the exhaust valve 68 can be closed quickly as well as switch 75 being opened quickly.

To accomplish the foregoing function of the damping device 125, the rod 126 is fixedly attached to the oscillatable shaft 70 and extends into engagement with a damping piston 127 that is reciprocable in a cylinder 128 connected with a chamber space 129 through which the rod 126 extends.

Figure 5:
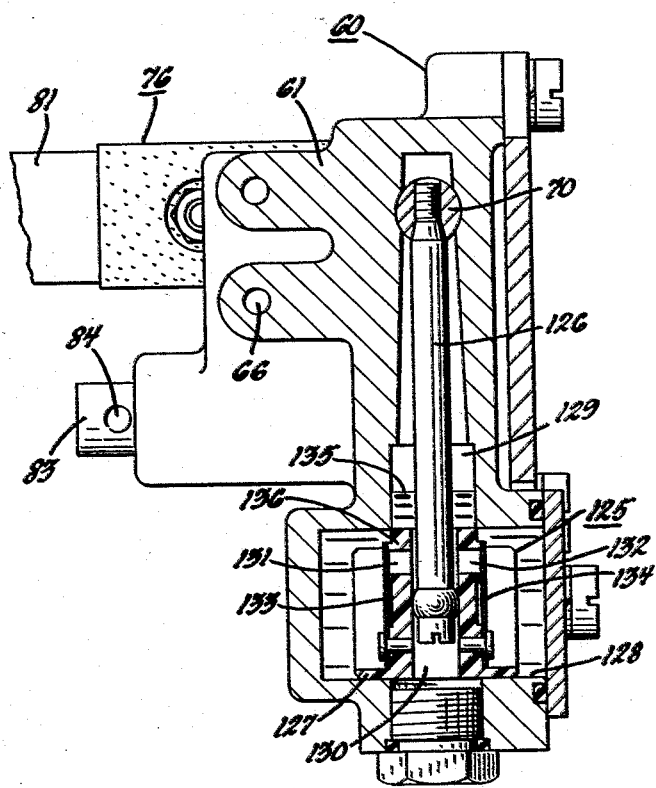
FIGURE 5 is a transverse cross-sectional view taken along line 5—5 of FIGURE 6.

The piston 127 has a central port 130 and axially extending ports 131 and 132 closed by valves 133 and 134 respectively. The chambers at opposite sides of the piston 127 are filled with a damping hydraulic fluid, and the fluid extends partially upwardly into the chamber 129, as shown by the liquid level 135. The piston 127 has a land portion 136 that is equal in length to the diameter of the chamber 129, as shown in FIGURE 5. Thus when the damping piston is in neutral or center position in the damping cylinder 128, the land portion 136 just spans the opening of chamber 129, as shown in FIGURE 5.

When the damping piston 127 moves in a left-hand direction from the position shown in FIGURE 5, liquid entrapped on the left-hand side of the piston will be caused to move through the clearance provided between the periphery of the piston 127 and the cylinder 128, the clearance passage so provided controlling the rate of movement of the piston 127 in a left-hand direction. Obviously at this time valve 133 is closed. Also, when the piston moves in the left-hand direction, the right-hand edge of the land 136 on piston 127 moves away from the right-hand edge of the chamber 129 so that the liquid chamber space on the right-hand side of the piston 127 is open fully to the reserve fluid in the chamber 129.

Thus, when the shaft 70 tends to return to its neutral position, fluid from the chamber on the right-hand side of the piston 127 can pass readily into the reserve chamber space 129 and the valve 133 will open at this time to allow free flow of fluid from the reserve chamber space 129 to the chamber space on the left-hand side of the piston 127. Thus movement of the piston 127 back to its neutral position is unrestricted and provides for a quick return to center or neutral position after either valve 68 is opened or switch 75 has been closed. Obviously movement of piston 127 in the right-hand direction follows the same general operation.

Thus, movement of the control arms 69 and 71 for the exhaust valve 68 and the switch 75 will be restricted in their movements toward opening of the valve 68 or closing of the switch 75 by the damping device 125 for a predetermined time period, after which the valve or the switch can be actuated. But once the valve 68 or the switch 75 has been operated, and the arms 69 and 71 are moved from their neutral position, they can return quickly to the neutral position to allow quick closing of the valve 68 and quick opening of the switch 75.

The damping device 125 therefore controls operation of the valve 68 and the switch 75 to prevent continuous alternate operation of these members on alternate relative movement between the sprung assembly and the unsprung assembly of the vehicle, the overtravel mechanism 76 allowing for the greater relative movement required between the sprung mass and the unsprung mass of the vehicle.

While the apparatus heretofore disclosed and described has been particularly illustrated and described with reference to the use of an air spring as an auxiliary to the main springs 14 and 15, obviously the air springs 30 and 30a could be used as the main suspension springs in a vehicle with the automatic clearance height control system performing the same functions as hereinbefore described.

While the embodiment of the invention as herein disclosed constitutes a preferred form, it is to be understood that other forms might be adopted.

What is claimed is as follows:

1. A clearance height control system to maintain an established clearance height between the sprung mass and the unsprung mass of a vehicle, comprising, fluid spring means between the sprung mass and the unsprung mass of a vehicle pressurization of which maintains an established clearance height therebetween, an electrically operated fluid pressure generating compressor providing pressurized fluid supply for said spring means, a clearance height control mechanism providing for a free flow of pressurized fluid flow to said fluid spring from said compressor and a valved exhaust of fluid from said fluid spring, said mechanism including electric switch means in electric circuit with said compressor and actuated by decreasing clearance height from an established clearance height to close said switch to energize said compressor means for fluid pressure supply to said fluid spring until said switch opens and including mechanically operated valve means actuated by increasing clearance height from the established clearance height to open said valve means for exhaust of fluid from said fluid spring.

2. A clearance height control system to maintain an established clearance height between the sprung mass and the unsprung mass of a vehicle, including in the combination, a sprung assembly and an unsprung assembly, said unsprung assembly comprising an axle and a pair of axially spaced ground engaging wheels mounted on the axle, a main suspension spring adjacent each wheel and connected with said sprung and unsprung assemblies to yieldably support said sprung assembly on said unsprung assembly in an established static clearance height relationship, an auxiliary fluid spring disposed between said sprung and unsprung assembles, said spring being normally depressurized to provide for said main suspension spring normally to support said sprung mass on said unsprung mass at said established clearance height and pressurizable to aid support of the sprung assembly on the unsprung assembly on increase of load in the sprung assembly, an electrically operated fluid pressure generating compressor providing pressurized fluid supply for said auxiliary fluid spring, a clearance height control mechanism providing for a free flow of pressurized fluid flow to said fluid spring from said compressor and a valved exhaust of fluid from said fluid spring, said mechanism including electric switch means in electric circuit with said compressor and actuated by decreasing clearance height from an established clearance height to close said switch to energize said compressor means for fluid pressure supply to said fluid spring until said switch opens and including mechanically operated valve means actuated by increasing clearance height from the established clearance height to open said valve means for exhaust of fluid from said fluid spring, and normally open electric switch means in series circuit with said first mentioned switch to retain said control system inactive until closed by the operator of the vehicle.

3. A clearance height control system constructed and arranged in accordance with claim 2 wherein said auxiliary fluid spring comprises a direct acting type tubular shock absorber having relatively telescoping parts with one end of the air spring attached to one of said telescoping parts and the opposite end of the air spring attached to the other of said telescoping parts.

4. A clearance height control system to maintain an established clearance height between the sprung mass and the unsprung mass of a vehicle, comprising, fluid spring means between the sprung mass and the unsprung mass of a vehicle pressurization of which maintains an established clearance height therebetween, an electrically operated fluid pressure generating compressor, a clearance height control mechanism providing free pressure fluid connection between said compressor and said air spring and controlling valved exhaust of fluid from said air spring, said mechanism including a mechanically operated exhaust valve and an electric switch, said switch having electric circuit arrangement with said compressor, said control mechanism including an operating arm selectively engageable with said switch and said valve to operate the same on alternate operation of the said arm from a neutral position at which said switch is in open position and said exhaust valve is closed, said switch means when closed maintaining electric circuit to said compressor for pressurized fluid supply from said compressor to said air spring continuously until opened by said arm on relative movement between said sprung mass and said unsprung mass.

5. A clearance height control system to maintain an established clearance height between the sprung mass and the unsprung mass of a vehicle, including in the combination, a sprung assembly and an unsprung assembly, said unsprung assembly comprising an axle and a pair of axially spaced ground engaging wheels mounted on the axle, a main suspension spring adjacent each wheel and connected with said sprung and unsprung assembles to yieldably support said sprung assembly on said unsprung assembly in an established static clearance height relationship, an auxiliary fluid spring disposed adjacent each of said main springs between said sprung and unsprung assemblies, said auxiliary spring being normally depressurized for said main suspension springs to support said sprung mass on said unsprung mass and pressurizable to aid support of the sprung assembly on the unsprung assembly on increase of load in the sprung assembly, an electrically operated fluid pressure generating compressor, a clearance height control mechanism in fluid connection between said compressor and said air springs controlling supply and exhaust of fluid to and from said air springs, said mechanism including a mechanically operated fluid exhaust valve and an electric switch, said switch having electric circuit arrangement with said compressor to operate the same when said switch is closed, said control mechanism including an operating arm means selectively engageable with said switch and said valve to operate the same on alternate operation of the said arm means from a neutral position at which said switch is in open position and said exhaust valve is closed, and damping means connected to said operating arm means resisting movement thereof in either direction from said neutral position to close said switch on a decreasing clearance height from said established clearance height and initiate operation of said compressor thereby to increase fluid pressure in said air spring until said operating arm means returns to neutral position at which said switch is opened to stop said compressor and also to open said exhaust valve in the opposite direction of movement from said neutral position on increasing clearance height from said established clearance height to exhaust fluid from said air spring until said operating arm means returns to neutral position at which said exhaust valve closes, said damping means providing for movement of said operating arm means from said neutral position in either direction with predetermined time delay and substantially instantaneous free return of the operatnig arm means to said neutral position from either direction of movement thereof.

6. Apparatus constructed and arranged in accordance with that set forth in claim 5 wherein the said auxiliary spring means each comprises a direct acting type tubular shock absorber having relatively telescoping parts with one end of the air spring attached to one of said telescoping parts and the opposite end of the air spring attached to the other of said telescoping parts with said shock absorber thereby forming a part of the wall structure for said air spring and defining a fluid pressure receiving chamber that can be pressurized and exhausted.

References Cited in the file of this patent

UNITED STATES PATENTS

| | | |
|---|---|---|
| 2,361,575 | Thompson | Oct. 31, 1944 |
| 2,887,324 | Jackson | May 19, 1959 |
| 2,893,104 | Hancock | July 7, 1959 |
| 2,921,160 | Lautzenhiser | Jan. 12, 1960 |
| 2,967,547 | Pribonic | Jan. 10, 1961 |
| 2,987,312 | Alliquant | June 6, 1961 |

FOREIGN PATENTS

| | | |
|---|---|---|
| 214,922 | Australia | May 2, 1958 |